United States Patent
Mahoney

(10) Patent No.: US 10,218,123 B1
(45) Date of Patent: Feb. 26, 2019

(54) COAXIAL PIN CONNECTOR SEIZURE ASSEMBLY

(71) Applicant: Cisco Technology, Inc., San Jose, CA (US)

(72) Inventor: William George Mahoney, Suwanee, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/795,496

(22) Filed: Oct. 27, 2017

(51) Int. Cl.
 *H01R 4/50* (2006.01)
 *H01R 13/639* (2006.01)
 *G02B 6/38* (2006.01)
 *H01R 12/71* (2011.01)

(52) U.S. Cl.
 CPC ....... *H01R 13/6395* (2013.01); *G02B 6/3817* (2013.01); *H01R 12/712* (2013.01)

(58) Field of Classification Search
 CPC ............ H01R 13/6395; H01R 13/6581; H01R 13/74; H01R 12/712; G02B 6/3817
 See application file for complete search history.

(56) References Cited

U.S. PATENT DOCUMENTS

| | | | | |
|---|---|---|---|---|
| 3,885,459 A | * | 5/1975 | Freese | F01B 3/0052 92/119 |
| 5,713,333 A | * | 2/1998 | Cooper | F02M 41/06 123/450 |
| 8,235,749 B2 | * | 8/2012 | Weldon | H01R 13/74 439/565 |
| 2006/0078645 A1 | * | 4/2006 | Seidel | B29C 45/16 425/568 |
| 2015/0038009 A1 | * | 2/2015 | Gibson | H01R 13/6581 439/578 |
| 2018/0171949 A1 | * | 6/2018 | Shaull | F02M 59/08 |

\* cited by examiner

*Primary Examiner* — Jean F Duverne
(74) *Attorney, Agent, or Firm* — Merchant & Gould P.C.

(57) ABSTRACT

A container may be provided. The container may comprise a seizure assembly, a housing, a circuit board, and a pin connector. The seizure assembly may comprise a retainer, a pressure applicator, and a charger. The retainer may comprise a casing and a nose with a nose opening. The charger may apply a force to the pressure applicator forcing the pressure applicator into the casing. The housing may comprise a housing cavity in which the seizure assembly is disposed, a housing wall comprising a housing opening that may be congruent with the nose opening, and a housing bottom comprising a charger recess in which the charger is disposed. The circuit board may be disposed in the housing cavity and may have an extender comprising a body and a head. The pin connector may be disposed in the housing wall and have a pin disposed between the pressure applicator and the head.

20 Claims, 5 Drawing Sheets

COAXIAL PIN CONNECTOR SEIZURE ASSEMBLY

TECHNICAL FIELD

The present disclosure relates generally to a seizure assembly for providing connectivity with a conductor.

BACKGROUND

A Hybrid Fiber-Coaxial (HFC) network is a broadband network that combines optical fiber and coaxial cable. It has been commonly employed globally by cable television operators. In a hybrid fiber-coaxial cable network, television channels are sent from a cable system's distribution facility (e.g., a headend) to local communities through optical fiber trunk lines. At the local community, a box translates the signal from a light beam to electrical signal, and sends it over cable lines for distribution to subscriber residences. The optical fiber trunk lines provide adequate bandwidth to allow future expansion and new bandwidth-intensive services.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1A:
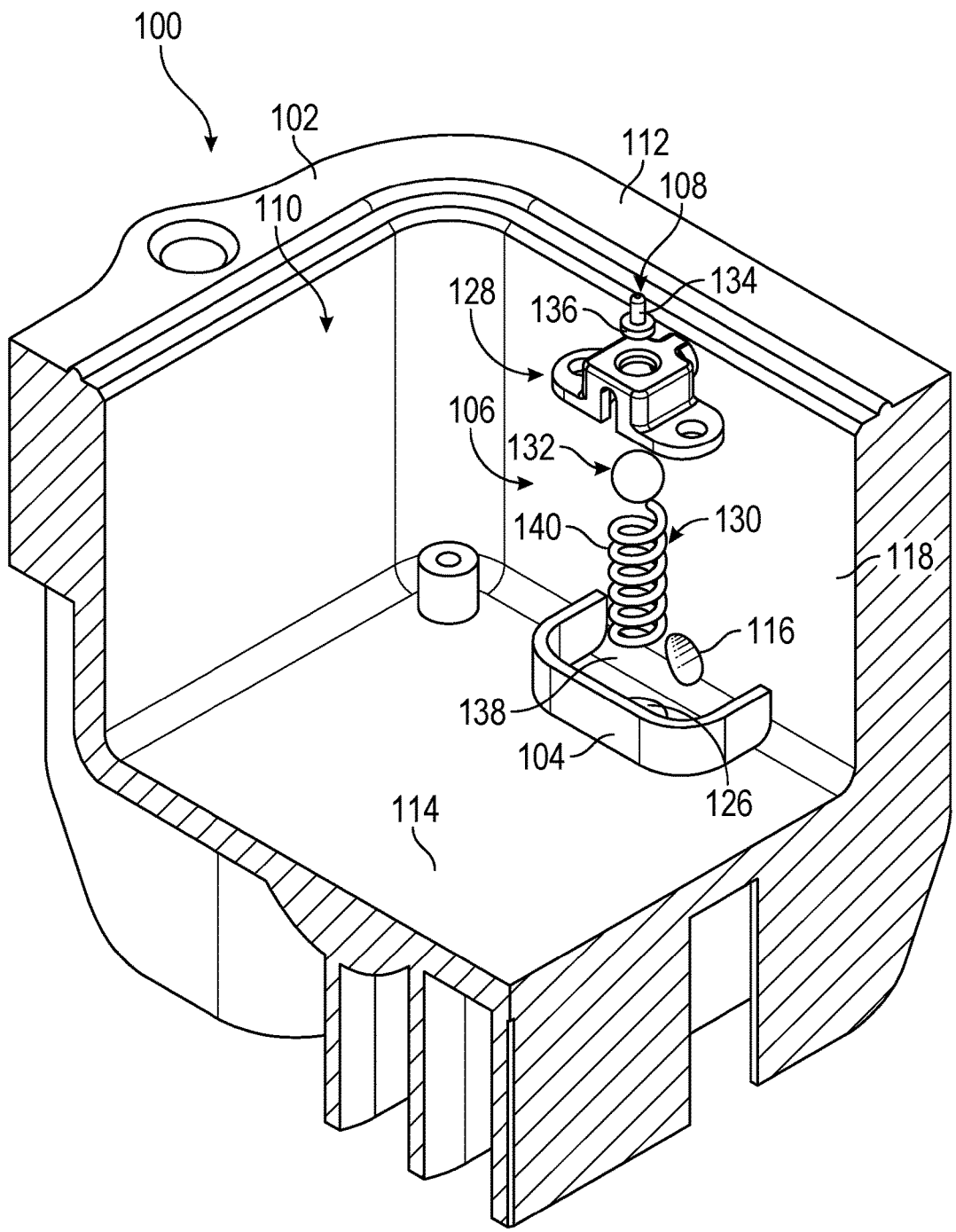
FIG. 1A and FIG. 1B show a container including a seizure assembly.

A container may be provided. The container may comprise a seizure assembly, a housing, a circuit board, and a pin connector. The seizure assembly may comprise a retainer, a pressure applicator, and a charger. The retainer may comprise a casing and a nose with a nose opening. The charger may apply a force to the pressure applicator forcing the pressure applicator into the casing. The housing may comprise a housing cavity in which the seizure assembly may be disposed, a housing wall comprising a housing opening that may be congruent with the nose opening, and a housing bottom comprising a charger recess in which the charger may be disposed. The circuit board may be disposed in the housing cavity and may have an extender comprising a body and a head. The pin connector may be disposed in the housing wall and have a pin disposed between the pressure applicator and the head.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

In an HFC network, a node may comprise a container that may house optical and electrical circuitry. An optical fiber cable may be connected to one side of the node and a plurality of coaxial cables may be connected to the other side of the node. The optical fiber cable may be connected to a headend in the HFC network and the plurality of coaxial cables may be connected to Customer Premises Equipment (CPE) of subscribers to the HFC. As such, the node may facilitate communications between the headend and the CPE.

In conventional systems, a container (e.g., comprising a node) may have to be opened in order to connect a coaxial cable to electrical circuitry in the container. Because the container may be exposed to environmental elements (e.g., the weather), opening the container may expose the optical and electrical circuitry within the container to these environmental elements. Accordingly, embodiments of the disclosure may provide an internal seizure assembly that may eliminate weather leak points for the container. Furthermore, embodiments of the disclosure may not require access from an exterior of the container in the event the container may become obstructed by a mounting surface such as a wall or pedestal due to the manner in which the container was mounted.

Figure 1B:
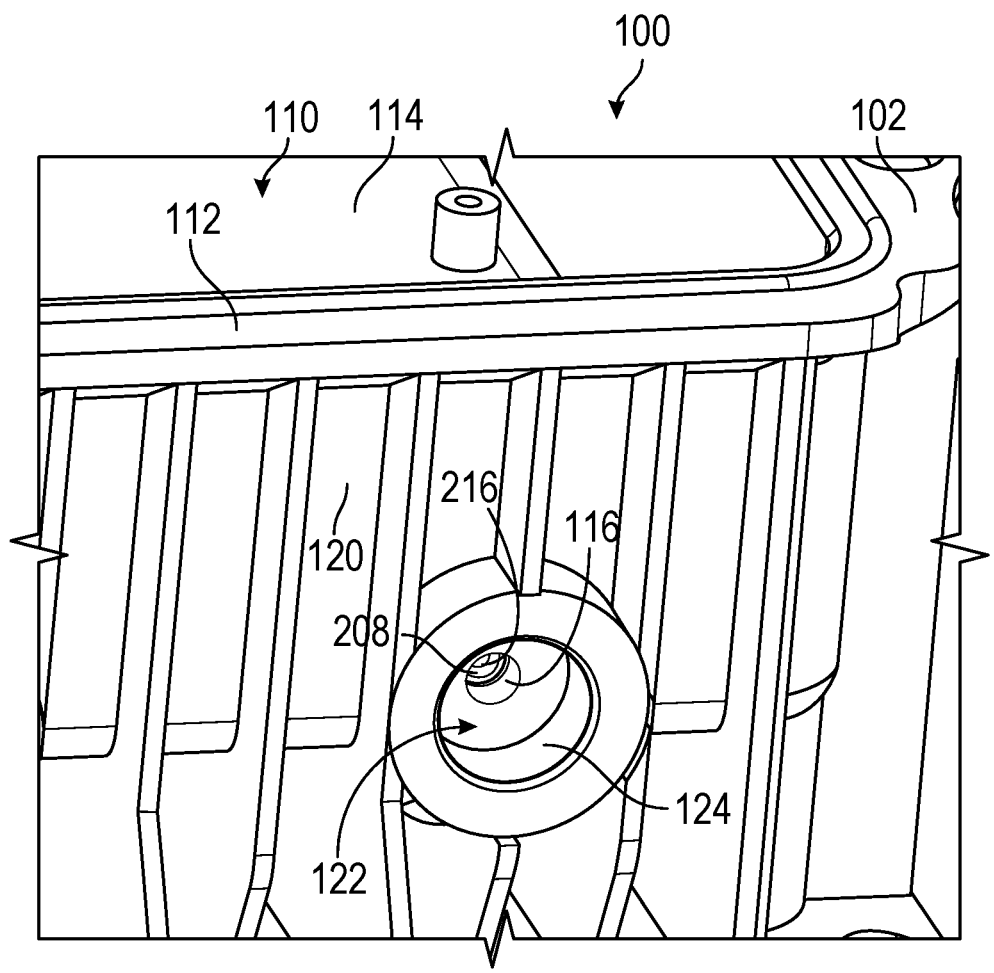

FIG. 1A and FIG. 1B show a container 100 consistent with embodiments of the disclosure. As shown in FIG. 1A and FIG. 1B, container 100 may include a housing 102, backing wall 104, a seizure assembly 106, and an extender 108. Housing 102 may comprise a housing cavity 110, a housing wall 112, and a housing bottom 114. Housing wall 112 may comprise a housing opening 116, a housing wall inner surface 118, a housing wall outer surface 120, a pin connector opening 122, and a pin connector opening inner surface 124. Housing bottom 114 may include a charger recess 126. Seizure assembly 106 may comprise a retainer 128, a charger 130, and a pressure applicator 132. Extender 108 may be electrically conductive and may comprise a body 134 and a head 136.

Figure 2A:
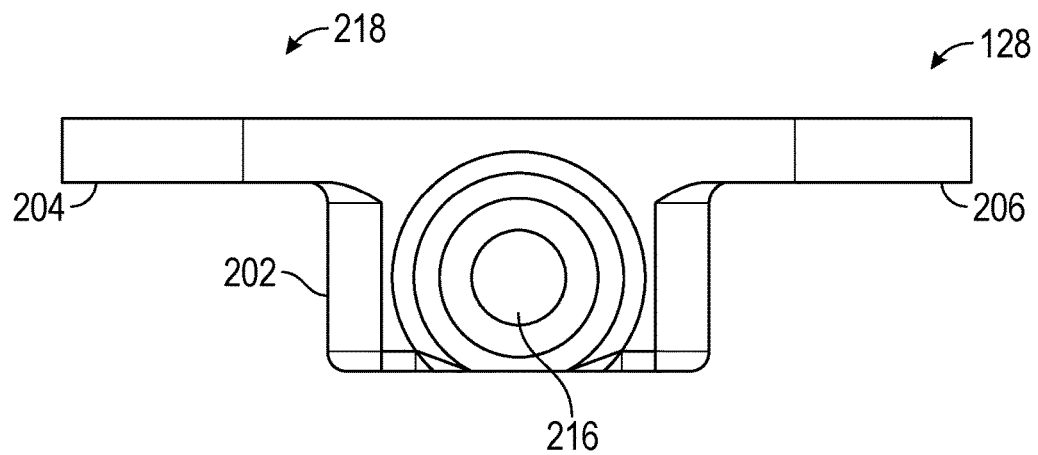
FIG. 2A and FIG. 2B show a retainer.
Figure 2B:
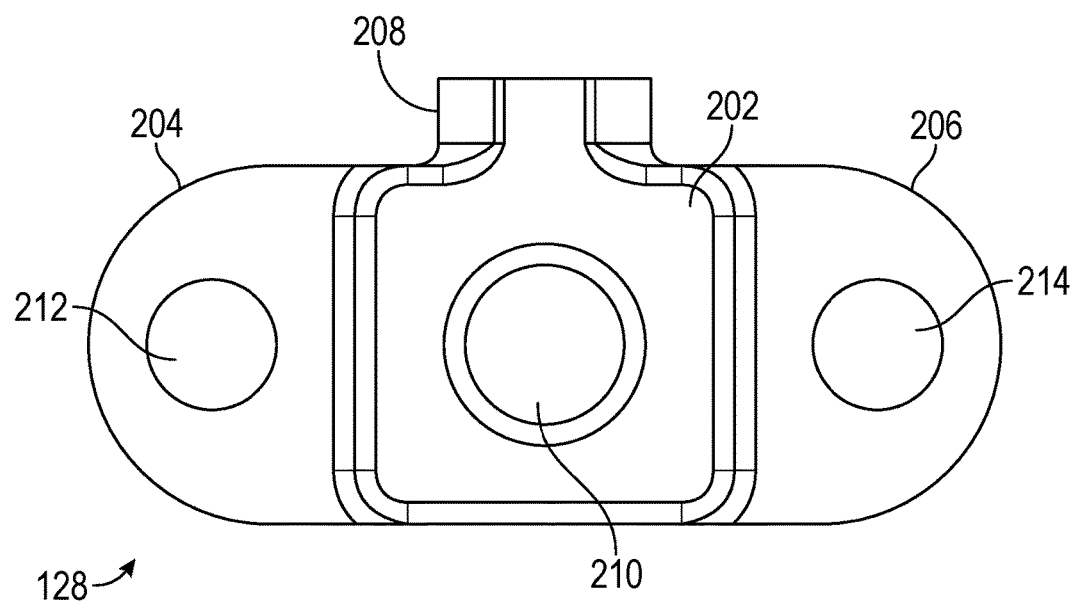

FIG. 2A and FIG. 2B show retainer 128 in more detail. As shown in FIG. 2A and FIG. 2B, retainer 128 may comprise a casing 202, a first flange 204, a second flange 206, and a nose 208. Nose 208 may be substantially cylindrical and may extend from casing 202. Casing 202 may include a casing opening 210, first flange 204 may include a first fastener opening 212, second flange 206 may include a second fastener opening 214, and nose 208 may include a nose opening 216. Retainer 128 may also comprise a retainer bottom 218. A retainer volume may exist inside retainer 128 extending within an interior of casing 202 and nose 208. The retainer volume may be open by casing opening 210 and nose opening 216.

Turning back to FIG. 1A, an exploded view of seizure assembly 106 may be shown. As shown in FIG. 1A, charger 130 may be placed in charger recess 126. Charger recess 126 may comprise an opening (e.g., a cylindrical opening) in housing bottom 114 and may have a charger recess bottom 408 (see FIG. 4) that may be parallel with housing bottom 114. A first end 138 of charger 130 may be adjacent to charger recess bottom 408 and a second end 140 of charger 130 may be adjacent to pressure applicator 132. Pressure applicator 132 may be within casing 202 and may be exposed by casing opening 210. Head 136 of extender 108 may extend into casing opening 210 and may contact pressure applicator 132. As shown in FIG. 1A, charger 130 may comprise a spring (e.g., a coiled spring) and may be electrically conductive or electrically non-conductive. Pressure applicator 132 may be spherically shaped (e.g., ball shaped) and may be electrically conductive or electrically non-conductive.

Figure 3:
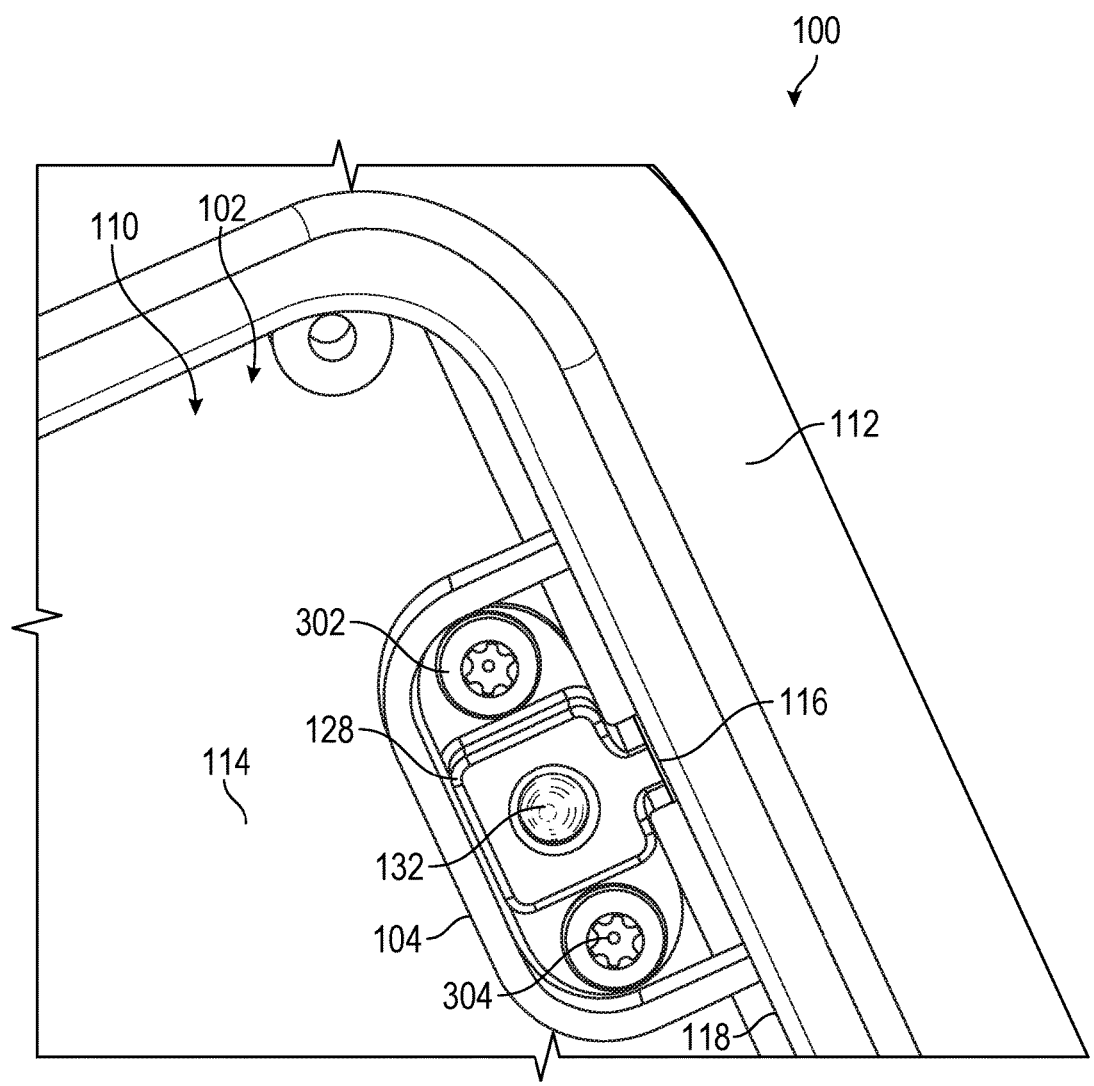
FIG. 3 shows a seizure assembly.

FIG. 3 shows a non-exploded view of seizure assembly 106 in which retainer 128 of seizure assembly 106 is attached to housing bottom 114 placing seizure assembly 106 in a charged configuration. As shown in FIG. 3, retainer 128 may be disposed between backing wall 104 and housing wall inner surface 118. A first fastener 302 may be placed in first fastener opening 212 of first flange 204. Similarly, a second fastener 304 may be placed in second fastener opening 214 of second flange 206. With first fastener 302 and second fastener 304 attached and tightened into housing bottom 114, retainer bottom 218 may be adjacent to housing bottom 114 and retainer 128 may be affixed to housing bottom 114.

In the position of retainer 128 shown in FIG. 3, nose 208 may be in line with housing opening 116 and nose opening 216 may be concentric with housing opening 116. With retainer bottom 218 adjacent housing bottom 114, charger 130 may be in a charged position (i.e., charged). In other words, as retainer 128 is pressed into place against housing bottom 114, retainer 128 may apply a force against pressure applicator 132 (e.g., held inside casing 202) that may in turn apply the force to charger 130 that may compress against charger recess bottom 408. Once seizure assembly 106 is placed in the charged configuration of FIG. 3 where retainer 128 is affixed to housing bottom 114, pressure applicator 132 may be free to rotate inside casing 202 and may be exposed through casing opening 210.

Figure 4:
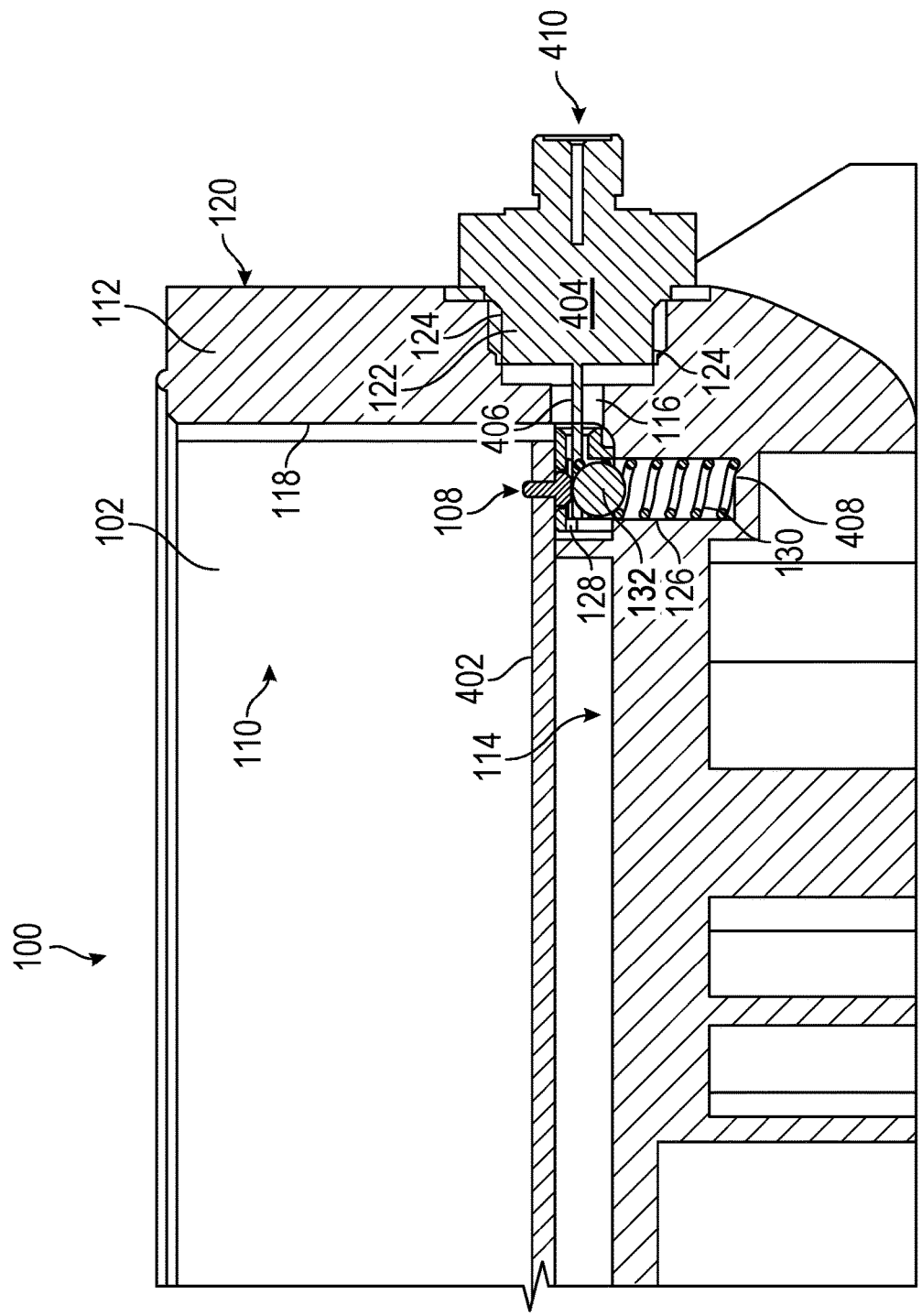
FIG. 4 shows a side-view of a container including a seizure assembly.

FIG. 4 shows container 100 in which a circuit board 402 is disposed within container 100 and in which a pin connector 404 is attached to container 100. Pin connector 404 may comprise a pin 406. Furthermore, pin connector 404 may comprise an outlet 410 into which a conductor of a cable (e.g., coaxial cable) may be inserted. When the conductor is inserted into outlet 410, the conductor may make an electrical connection with pin 406.

As shown in FIG. 4, extender 108 may be attached (e.g., soldered) on to circuit board 402 and may be connected in an electrical pathway (i.e., a circuit) to other devices and elements on circuit board 402. The other elements on circuit board 402 may comprise, but are not limited to, electrical and electronic devices and elements. Circuit board 402 may be disposed within container 100 in such a way that, with extender 108 attached to circuit board 402, head 136 of extender 108 may be disposed within or otherwise in line with casing opening 210. In this configuration, head 136 of extender 108 may contact pressure applicator 132.

With circuit board 402 disposed within container 100, pin connector 404 may be attached to container 100. As shown in FIG. 4, pin connector 404 may be disposed within pin connector opening 122 of housing 102. For example, pin connector opening inner surface 124 may be threaded and pin connector 404 may comprise complementary threading. As such, pin connector 404 may be "screwed" into pin connector opening 122.

As pin connector 404 is being attached to container 100, pin 406 may pass through pin connector opening 122, may pass through housing opening 116, and may enter nose opening 216. Pin 406 may continue through nose opening 216 and into the interior of casing 202 to a point where pin 406 engages pressure applicator 132 and head 136 of extender 108. As pin connector 404 is attached to container 100, pin 406 may continue into the interior of casing 202 and make contact with pressure applicator 132 on one side of pin 406 and head 136 of extender 108 on another side of pin 406.

Head 136 may be curved or otherwise "dome shaped" and pressure applicator 132 may be spherical. Accordingly, pin 406 may readily insert and slide in between head 136 and pressure applicator 132 due to the geometries of head 136 and pressure applicator 132. Furthermore, head 136 and pressure applicator 132 may comprise materials with a low coefficient of friction in order to facilitate the insertion of pin 406 between head 136 and pressure applicator 132.

In the configuration if FIG. 4, charger 130 may apply a force against pressure applicator 132 that may in turn apply the force to a side of pin 406. The force on pin 406 from pressure applicator 132 may press pin 406 against head 136 of extender 108 with enough force to create a good electrical connection between pin 406 and extender 108. With the conductor of the cable (e.g., coaxial cable) in electrical connection with pin 406 (as described above) and with extender 108 connected to other devices and elements on circuit board 402 (as described above), the aforementioned electrical connection between pin 406 and extender 108 may create an electrical pathway between the conductor of the cable and devices and elements on circuit board 402.

Accordingly, embodiments of the disclosure may provide seizure assembly 106 that may eliminate weather leak points for container 100. Furthermore, embodiments of the disclosure may not require access from an exterior of container 100 in the event container 100 may become obstructed, for example, by a mounting surface such as a wall or pedestal due to the manner in which container 100 may have been mounted.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. An apparatus comprising:
   a seizure assembly comprising;
      a retainer comprising,
         a casing, and
         a nose comprising a nose opening,
      a pressure applicator, and
      a charger that applies a force to the pressure applicator
         forcing the pressure applicator into the casing; and a housing comprising;
- a housing cavity in which the seizure assembly is disposed,
- a housing wall comprising a housing opening being congruent with the nose opening, and
- a housing bottom comprising a charger recess in which the charger is disposed.

2. The apparatus of claim 1, further comprising a circuit board disposed in the housing cavity, the circuit board comprising an extender comprising a body and a head, the head being disposed in a casing opening disposed in the casing.

3. The apparatus of claim 2, wherein the extender is connected in an electrical pathway on the circuit board to elements on the circuit board.

4. The apparatus of claim 2, further comprising a pin connector disposed in the housing wall, the pin connector comprising a pin wherein the pin is disposed between the pressure applicator and the head.

5. The apparatus of claim 4, wherein the pin extends from the pin connector and extends into the housing opening and the nose opening.

6. The apparatus of claim 1, wherein the nose is adjacent a housing wall inner surface of the housing wall.

7. The apparatus of claim 1, wherein the nose is substantially cylindrical.

8. The apparatus of claim 1, wherein the nose opening and the housing opening comprise concentric circles.

9. The apparatus of claim 1, wherein the retainer is attached to the housing bottom.

10. The apparatus of claim 1, wherein the retainer is attached to the housing bottom via a fastener disposed in a fastener opening in a flange extending from the retainer.

11. The apparatus of claim 1, wherein the charger comprises a spring.

12. The apparatus of claim 1, wherein the pressure applicator is spherical.

13. An apparatus comprising:
- a seizure assembly comprising;
  - a retainer comprising,
    - a casing comprising a casing opening, and
    - a nose comprising a nose opening,
  - a pressure applicator, and
  - a charger that applies a force to the pressure applicator forcing the pressure applicator into the casing; and
- a pin connector comprising a pin wherein the pin is disposed between the pressure applicator and a head of an extender, the head being disposed in the casing opening.

14. The apparatus of claim 13, further comprising a circuit board on which the extender is disposed.

15. The apparatus of claim 14, wherein the extender is connected in an electrical pathway on the circuit board to elements on the circuit board.

16. The apparatus of claim 14, further comprising a housing wherein the housing comprises a housing cavity in which the seizure assembly is disposed.

17. The apparatus of claim 16, wherein the housing comprises a charger recess in a housing bottom of the housing, the charger being disposed in the charger recess.

18. The apparatus of claim 16, wherein the retainer is attached to the housing bottom.

19. The apparatus of claim 16, wherein the retainer is attached to the housing bottom via at least one fastener disposed in a fastener opening in a flange extending from the retainer.

20. An apparatus comprising:
- a seizure assembly comprising;
  - a retainer comprising,
    - a casing, and
    - a nose comprising a nose opening,
  - a pressure applicator, and
  - a charger that applies a force to the pressure applicator forcing the pressure applicator into the casing;
- a housing comprising;
  - a housing cavity in which the seizure assembly is disposed,
  - a housing wall comprising a housing opening being congruent with the nose opening, and
  - a housing bottom comprising a charger recess in which the charger is disposed;
- a circuit board disposed in the housing cavity, the circuit board comprising an extender comprising a body and a head, the head being disposed in a casing opening disposed in the casing wherein the extender is connected in an electrical pathway on the circuit board to elements on the circuit board; and
- a pin connector disposed in the housing wall, the pin connector comprising a pin wherein the pin is disposed between the pressure applicator and the head wherein the pin extends from the pin connector and extends into the housing opening and the nose opening.

* * * * *